United States Patent
Figueira et al.

(10) Patent No.: US 9,019,963 B2
(45) Date of Patent: **\*Apr. 28, 2015**

(54) METHOD AND APPARATUS FOR DIRECT FRAME SWITCHING USING FRAME CONTAINED DESTINATION INFORMATION

(75) Inventors: Norival R. Figueira, Campbell, CA (US); Paul A. Bottorff, Palo Alto, CA (US); Guyves Achtari, San Jose, CA (US); Huiwen Li, San Jose, CA (US)

(73) Assignee: Constellation Technologies, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,145

(22) Filed: Feb. 27, 2012

(65) Prior Publication Data

US 2012/0155473 A1  Jun. 21, 2012

Related U.S. Application Data

(63) Continuation of application No. 12/757,209, filed on Apr. 9, 2010, now Pat. No. 8,228,916, which is a continuation of application No. 10/718,129, filed on Nov. 20, 2003, now Pat. No. 7,697,527.

(60) Provisional application No. 60/491,028, filed on Jul. 30, 2003.

(51) Int. Cl.
*H04L 12/28* (2006.01)
*H04L 12/931* (2013.01)

(52) U.S. Cl.
CPC ............. *H04L 49/602* (2013.01); *H04L 49/201* (2013.01)

(58) Field of Classification Search
CPC ........................... H04L 49/602; H04L 49/201

USPC .......................................... 370/392, 401, 389
See application file for complete search history.

(56) References Cited

U.S. PATENT DOCUMENTS

| | | |
|---|---|---|
| 6,556,574 B1 | 4/2003 | Pearce et al. |
| 6,671,828 B1 | 12/2003 | Tursich |
| 6,707,814 B1 | 3/2004 | Ohgane |
| 6,891,887 B1 | 5/2005 | Dobson |
| 6,970,470 B2 | 11/2005 | Yazaki et al. |
| 7,016,361 B2 * | 3/2006 | Swonk et al. ................ 370/401 |
| 7,107,326 B1 | 9/2006 | Fijolek et al. |
| 7,124,197 B2 | 10/2006 | Ocepek et al. |
| 7,190,695 B2 | 3/2007 | Schaub et al. |
| 7,190,696 B1 | 3/2007 | Manur et al. |
| 7,254,138 B2 | 8/2007 | Sandstrom |
| 7,277,399 B1 | 10/2007 | Hughes, Jr. |
| 7,406,518 B2 | 7/2008 | Lasserre |
| 7,586,941 B2 | 9/2009 | Gonda |

\* cited by examiner

*Primary Examiner* — Chandrahas Patel
(74) *Attorney, Agent, or Firm* — Christopher & Weisberg, P.A.

(57) ABSTRACT

Frame contained destination information may be used by a switch to identify an appropriate output port for a given frame without performing a table access operation. This reduces the processing requirements of the switch to enable the switch to handle frames more efficiently. The frame contained destination information may be contained in the frame's local destination MAC addresses (DA) such that a portion of the DA directly indicates, for each switch that handles the frame, an output port for that switch. Different portions of the DA may be used by different switches, depending on where they are in the network hierarchy. Large switches may also use sub-fields within their allocated portion in the DA to identify internal switching components. A location resolution server may be provided to store and distribute IP and MAC addresses and respond to local ARP requests on the local domain.

12 Claims, 3 Drawing Sheets

METHOD AND APPARATUS FOR DIRECT FRAME SWITCHING USING FRAME CONTAINED DESTINATION INFORMATION

CROSS REFERENCE TO RELATED APPLICATIONS

This application is a continuation application of U.S. patent application Ser. No. 12/757,209, filed Apr. 9, 2010 entitled "METHOD AND APPARATUS FOR DIRECT FRAME SWITCHING USING FRAME CONTAINED DESTINATION INFORMATION", which is a continuation of U.S. patent application Ser. No. 10/718,129, filed Nov. 20, 2003, now U.S. Pat. No. 7,697,527, which claims the benefit of U.S. Provisional Patent Application No. 60/491,028, filed Jul. 30, 2003, the contents of all of which are hereby incorporated herein by reference.

BACKGROUND

1. Field

This application relates to communication networks and, more particularly, to a method and apparatus for direct frame switching using frame contained destination information.

2. Description of the Related Art

Data communication networks may include various computers, servers, hubs, switches, nodes, routers, proxies, and other devices coupled to and configured to pass data to one another. These devices will be referred to herein as "network elements." Data is communicated through the data communication network by passing protocol data units, such as frames, packets, cells or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, and how protocol data units should be handled or routed through the network by the network elements.

A communication network may be viewed using what is commonly referred to as the seven layer Open Systems Interconnect (OSI) network model. In this model, there are seven layers of abstraction, ranging from physical mediums that actually handle the traffic at Layer 1 to applications that interact with each other and with users at Layer 7. The second layer, referred to in the OSI network model as the "link layer," will be of particular interest herein. Network elements that operate at the link layer are not network aware—that is they don't know about the overall network topology and hence do not make routing decisions as that term is commonly used. Rather, layer 2 network elements are configured to match an input protocol data unit with an output port and transmit the protocol data unit over the link attached to the identified output port. Protocol data units on the data link layer are commonly referred to as "frames."

There are two basic types of network elements that operate at the link layer: hubs and switches. Hubs transmit everything they receive over an interface on all other interfaces (ports). Switches, by contrast, are designed to output traffic to a particular port depending on where the traffic is to be sent. Generally, a switch operates by examining the content of a frame to determine the destination Media Access Control (MAC) address of a frame. Using the destination MAC address it then performs a table lookup to determine the interface through which the destination address may be reached, and outputs the frame on that interface.

In a conventional layer 2 switch using common layer 2 forwarding techniques, the switch learns the MAC addresses of attached network elements and creates a table of destination MAC addresses and output port IDs so that the switch can forward frames to the proper destination ports. This table is constructed dynamically as the switch learns the MAC addresses of attached devices from the source MAC address fields of received frames. A received frame is forwarded to an appropriate port based on the frame's destination MAC address if that destination MAC address is contained in the forwarding table. If the destination MAC address is not in the forwarding table, the frame is generally sent to all ports (except the receiving port).

This leads to two drawbacks. First, proper frame forwarding can only take place once the switch's forwarding table has been populated. Before that, frames are sent to all ports thus generating excess network traffic. Second, the layer 2 switch is required to search its forwarding tables to determine whether it knows the destination port and to identify the correct destination port for each received frame. As larger switches are created and configured to connect to larger numbers of network elements, the large number of destination MAC addresses increases the size of the switch forwarding table, which generally translates into increased processing time to locate a destination port associated with a destination MAC address. At the same time, overall bandwidth on communication links is increasing, thus increasing the frequency at which frames can be expected to arrive a switch and, hence, reducing the amount of time available to the switch to process each frame. Accordingly, it would be advantageous to enable switches to handle frames using frame contained destination information.

SUMMARY OF THE DISCLOSURE

In the following detailed description, a method and apparatus for direct frame switching using frame contained destination information is described. According to one embodiment of the invention, direct frame switching may be performed by a layer 2 switch using frame contained destination information, such as the frame local destination MAC address. In this embodiment, by including an indicia, e.g., of the switch output port ID, in a field of the local destination MAC address, the switch may read the indicia from the local destination MAC address and ascertain directly from this indicia which output port should be used to transmit the frame. In this manner, the switch may output a received frame to the correct output port without performing a table lookup operation.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, by providing frame contained destination information in frames received at a switch, the switch is able to ascertain disposition information about the frame. For the frame contained destination information may contain a pointer into a table to accelerate a search for the destination port. Alternatively and preferably, the frame contained destination information may contain information sufficient to enable the switch to directly identify the appropriate output port for a given frame without performing a table access operation. Both embodiments reduce the processing requirements of the switch to enable the switch to handle frames more efficiently. In one embodiment, switches in a local domain are configured to use local destination MAC addresses configured such that a given switch can read a portion of the local destination MAC address and identify, from information contained in that portion, the output port on the switch where the frame should be output. Enabling a switch to identify the correct output port from information contained in the local destination MAC address allows the switch to forward frames having local MAC addresses without requiring the switch to implement a MAC address lookup in a MAC address table. Different portions of the local destination MAC address may be used by different tiers of switches, depending on where they are in the network hierarchy. Large switches may also use sub-fields within their allocated portion in the local destination MAC address to identify a portion of a MAC address table, one of several smaller MAC address tables, or internal components as desired.

Figure 1:
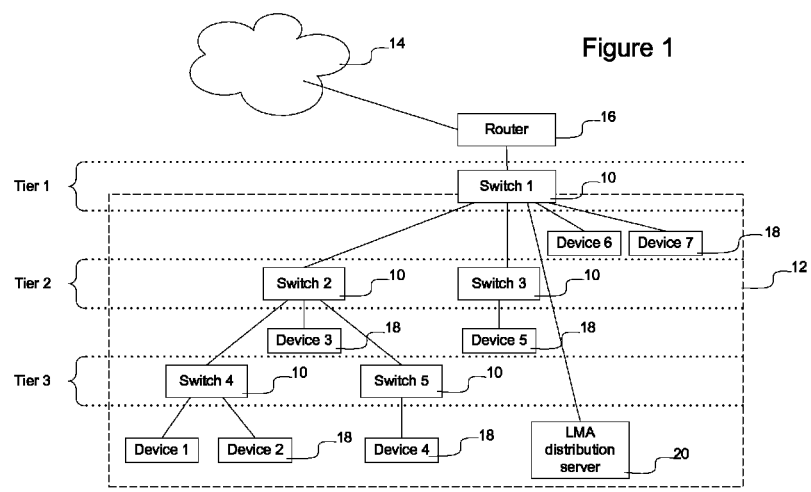
FIG. 1 is a functional block diagram of an example of a communication network including layer 2 switches according to an embodiment of the invention.

FIG. 1 illustrates one embodiment of a communication network. In the embodiment illustrated in FIG. 1, a first tier switch 10 connects a local domain 12 to a foreign domain 14 where non-local MAC addresses are used, or to another domain where other locally assigned MAC addresses are used. As used herein, the term "domain" will be used to refer to a network or group of networks under a common administration and with common routing/switching policies. While a single first tier switch 10 is illustrated in this example to simplify discussion of this embodiment, in practice there may be more than one switch connecting the local domain 12 with the foreign domain 14 to provide redundancy at this point in the network. As used herein, the term "local domain" will be used to refer to a set of switches that are configured to exchange frames containing a local destination MAC address. The local domain may be a classic domain, as that term is used in the industry, or may simply be an amalgamation of network elements, owned and administered by one or more entities, that have agreed to exchange frames using local MAC addresses.

In the example illustrated in FIG. 1, the local domain is illustrated as having several tiers of switches. The invention is not limited to this embodiment, however as any number of tiers of switches may be used as well. In this embodiment, the switch that connects the local domain 12 with external resources will be referred to herein as a Tier 1 switch, since it is the network switch in the local domain that is closest to the foreign domain. A router 16 may be used to interconnect the tier 1 switch with the foreign domain. Using a router to connect the domains enables the router 16 to perform network address translation to convert global MAC addresses or local MAC addresses used in the foreign domain to local MAC Addresses (LMAs) for use in the local domain. The invention is not limited to interconnecting the domains using a router, however, as another network element may be used as well.

The tier 1 switch may be connected directly to one or more network devices 18, such as device 6 and device 7, and, in a hierarchical network, may be connected to other switches 10 forming a second tier in the network. The tier 2 switches may be smaller switches having a smaller number of output ports than the tier 1 switch or may be switches having larger numbers of output ports. The relative size of the switches is not determinative of the tier. Rather, the tier will be used, as seen below, to indicate to a switch which field(s) in a local destination MAC address should be read by that switch to identify an appropriate output port for a received frame.

Tier 2 switches are switches that are connected to the tier 1 switch 10 by a direct network link or through a series of links and passive/active devices that do not perform switching or routing functions. Examples of such passive/active devices include bridges, amplifiers, signal repeaters, and other such devices. Tier 2 switches may be connected to network devices 18 such as device 3 or device 5, and optionally may be connected to Tier 3 switches as well. Similarly, Tier 3 switch may be connected to devices 18 or other switches 10 (not shown). Additional or fewer tiers may be used as well, and the invention is not limited to use on a network configured precisely as illustrated in FIG. 1.

Every interface on a network is provided with a Media Access Control (MAC) address. The Institute of Electrical and Electronics Engineers (IEEE) has defined a format for MAC addresses that ensures that the MAC address assigned to every interface on a network, such as a port on a network interface card, will be unique and different from all other MAC addresses assigned to all other interfaces. In this way, it is possible to positively identify a given interface on any communication network or network element.

Figure 2:
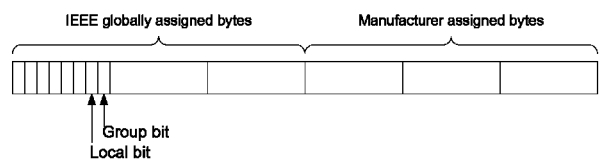
FIG. 2 is a diagram of a global MAC address.

FIG. 2 illustrates the IEEE-defined MAC address format. As shown in FIG. 2, the MAC address standard specifies that the MAC address must include 6 bytes. The first three bytes are assigned by the IEEE. Typically, the IEEE will assign a unique code to each manufacturer that intends to manufacture network elements to be used to communicate on a communication network. The last three bytes are assigned by the manufacturer to enable different devices made by the same manufacturer to be differentiated. This allows a manufacturer to assign up to $2^{24}$ different values to interfaces on its manufactured devices. There are also a few reserved bits. For example, the last bit of the first byte is reserved as a multicast indicator to enable the MAC address to specify whether the payload is being broadcast to a group or is being unicast to a specific network element. Another reserved bit, the second to last bit of the first byte, is reserved to indicate whether the MAC address is a global MAC address or is a local MAC address. If this bit is set to "1" the network element receiving the frame knows that the MAC address is a locally assigned MAC address which does not necessarily comply with the IEEE standard.

According to an embodiment of the invention, for a switch that operates within a local domain, destination MAC addresses within the domain are set to be local destination MAC addresses by setting the appropriate bit. These local MAC addresses are then established, either manually or automatically, to contain destination information that may be used by the switches handling traffic on the domain to help identify or automatically identify the destination interface for a received frame.

Figure 3:
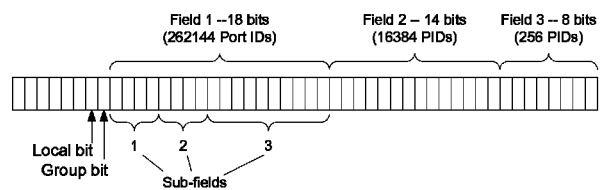
FIG. 3 is a diagram of a local MAC address according to an embodiment of the invention.

FIG. 3 illustrates a local destination MAC address that may be used in connection with embodiments described herein. As shown in FIG. 3, the local MAC address in this embodiment has been formatted to include several fields, each field containing bits that may be used by a switch in a tier to specify the identity of a port. For example, in the embodiment of FIG. 3, the local MAC address has a first field containing 18 bits corresponding to 262144 individual port identification numbers, a second field containing 14 bits corresponding to 16384 port identification numbers, and a third field containing 8 bits corresponding to 256 individual port identification numbers. These field lengths have been arbitrarily selected to illustrate the concepts that are described herein, they are not intended to limit the scope of the invention.

The fields may contain sub-fields 1-3 to enable large switches to specify a local MAC address that is usable by sub-components of the switch to specify how those sub-components of the switch should handle a given frame. This enables the switch to be built using an internal tree structure in which nodes of the tree would be internal switching components, e.g., cross-connects, switch fabrics, buses, line cards, look-up tables, etc. In the example illustrated in FIG. 3, the tier 1 field includes three sub-fields, sub-field 1, sub-field 2, and sub-field 3. For example, the sub-fields could be used to specify a switch card within the switch, a network processor on the switch card, and an output port from the network processor. The invention is not limited to this embodiment as any number of sub-fields may be used.

Figure 4:
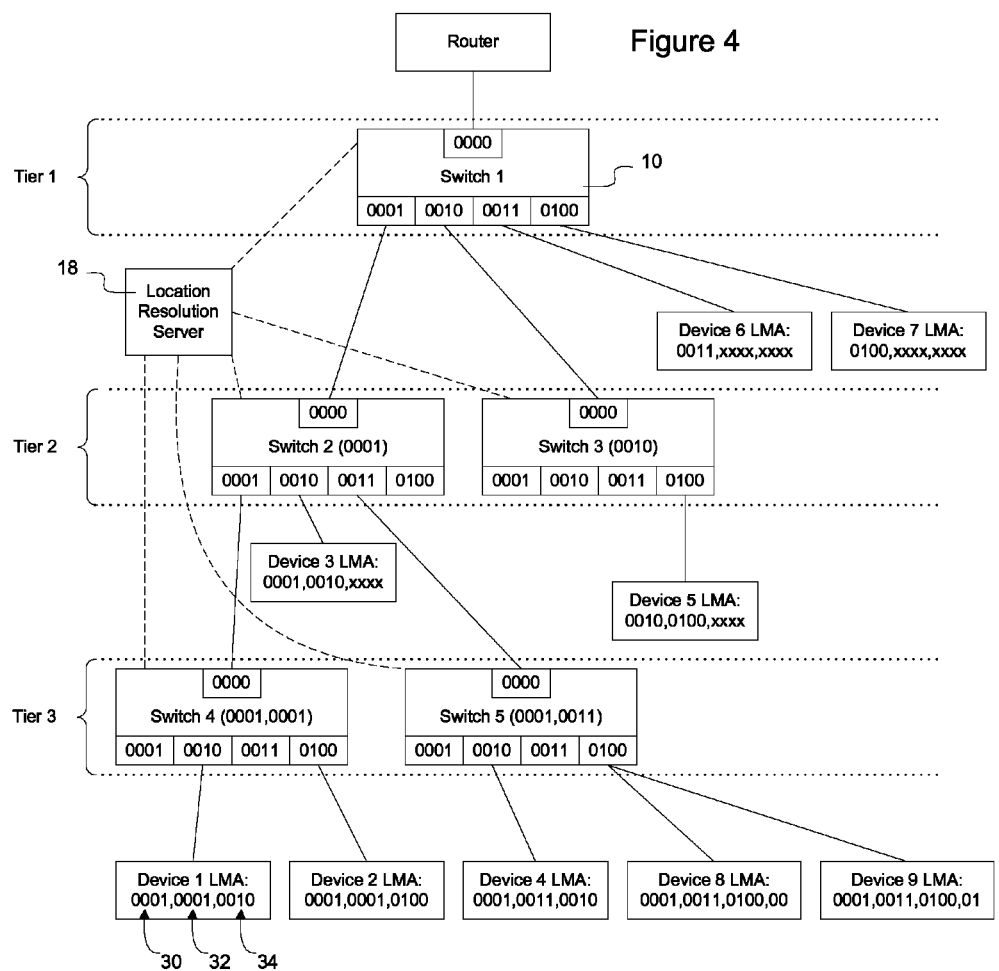
FIG. 4 is a more detailed functional block diagram of the communication network of FIG. 1 according to an embodiment of the invention.

FIG. 4 illustrates the example network of FIG. 1 in greater detail. In the following description, it will be assumed that the local bit of the IEEE 802 MAC address has been set. Frames that contain a global MAC address may be treated by the switches in a conventional manner, for example by causing the switch to perform a table lookup to determine an appropriate output port corresponding to the frame destination MAC address. This separation may be done in a dual plane switch, for example, by causing frames containing local destination MAC addresses to be handled in the transport plane and by redirecting frames with global destination MAC addresses to the control plane of the switch for further processing or to cause those frames to be discarded. The invention is not limited to the use in dual plane switch, however.

All network ports, e.g., communication ports on end devices, are required to have an assigned address to enable them to be identified on the network. In one embodiment of the invention, network ports are assigned local MAC addresses (LMAs) using an agreed-upon method such that the Destination LMA (DA) in a frame may be used to identify an output port on a switch when the frame is received by the switch. LMAs can be manually assigned or can be automatically assigned by a network switch or a network element configured on the network. Assignment and communication of local MAC addresses, will be discussed in greater detail below.

The LMAs assigned to network elements are configured such that all LMAs of devices connected to the same switch port have the same switching field value. However, other bit fields of the LMA enable the LMAs to be distinguished at a subsequent switch on the network. Since the destination address of a unicast frame contains an indication of the layer 2 switch's interface, the LMA of the received frame contains a switching field that directly indicates the destination port. This eliminates the need for a switch to obtain this information from a forwarding table, and significantly simplifies the forwarding process since forwarding is done based on the frame's destination MAC address only without requiring any additional information. This also eliminates the need for the layer 2 switch to learn destination MAC addresses and update its forwarding tables, and reduces network traffic by not requiring frames containing unknown MAC addresses to be broadcast to all ports.

In FIG. 1 there are three tiers of switches, although the invention is not limited to a network configuration having three tiers. For simplicity, each switch is illustrated as having a single upstream port having an LMA designation 0000, and four downstream ports having LMA designations 0001, 0010, 0011, 0100. In practice, the switches forming a network may have thousands of ports and probably would not all have exactly the same number of ports. This example is thus merely being used to illustrate concepts associated with the invention and is not intended to limit the claims to the particular illustrated example.

Each device on the network has an interface to enable it to receive and transmit frames on the network. The MAC address of the device will be used to identify the device and frames to be sent to the device will contain the device's local MAC address as the destination MAC address. As discussed below, the device's local MAC address can be manually assigned, can be assigned by the switch to which it connects, or can be assigned by a network element such as a local MAC address distribution server 20. However the local MAC addresses are assigned, they are configured such that switches on the network can forward frames to the destination device without performing table lookups.

In the example illustrated in FIG. 4, each device LMA has three fields, a first field 30 corresponding to the downstream port of the tier 1 switch where the frame is to be output; a second field 32 corresponding to the downstream port in the tier 2 switch where the frame is to be output; and a third field 34 corresponding to the downstream port in the tier 3 switch where the frame is to be output. Thus, for example, frames addressed to device 1 and received by Switch 1 at port 0000 are output to the tier 2 switch over downstream port 0001. Accordingly, the first field in Device 1's LMA is equal to 0001. Frames received by the second tier switch, Switch 2, are output over downstream port 0001 in Switch 2. Accordingly, the second field 32 of Device 1's LMA is set equal to 0001. Frames received by the third tier switch, Switch 4, are output over downstream port 0010. Accordingly, the third field 34 of Device 1's LMA is set to 0010.

The LMAs of the other devices on the network may be established the same way. Thus, for example, Device 2 is reachable through Switch 1 port 0001, Switch 2 port 0001, and Switch 4 port 0100. Accordingly, its LMA is set to "0001, 0001,0100." The following Table I illustrates assignment of LMAs to devices in this example:

TABLE I

| Device | Switch Ports | Local MAC address |
| --- | --- | --- |
| Router | Switch 1, Port 0000 | 0000,xxxx,xxxx |
| 1 | Switch 1, Port 0001 | 0001,0001,0010 |
|   | Switch 2, Port 0001 |   |
|   | Switch 4, Port 0010 |   |
| 2 | Switch 1, Port 0001 | 0001,0001,0100 |
|   | Switch 2, Port 0001 |   |
|   | Switch 4, Port 0100 |   |
| 3 | Switch 1, Port 0001 | 0001,0010,xxxx |
|   | Switch 2, Port 0010 |   |
|   | No third tier switch |   |
| 4 | Switch 1, Port 0001 | 0001,0011,0010 |
|   | Switch 2, Port 0011 |   |
|   | Switch 5, Port 0010 |   |
| 5 | Switch 1, Port 0010 | 0010,0100,xxxx |
|   | Switch 3, Port 0100 |   |
|   | No third tier switch |   |
| 6 | Switch 1, Port 0011 | 0011,xxxx,xxxx |
|   | No second tier switch |   |
|   | No third tier switch |   |
| 7 | Switch 1, Port 0100 | 0100,xxxx,xxxx |
|   | No second tier switch |   |
|   | No third tier switch |   |
| 8 | Switch 1, Port 0001 | 0001,0011,0010,00 |
|   | Switch 2, Port 0011 |   |
|   | Switch 5, Port 0100 |   |
| 9 | Switch 1, Port 0001 | 0001,0011,0010,01 |
|   | Switch 2, Port 0011 |   |
|   | Switch 5, Port 0100 |   |

In certain configurations, more than one network device may be connected to a port of a given switch. In this instance it may not be possible to uniquely identify the end device merely through a chain of destination port identification indicators. In this instance, a portion of the LMA may be used as a device field to uniquely identify devices attached to that port. Thus, for example, assume two devices were attached to port 0100 of Switch 5. The switch field portions of the LMA of each of the devices would be the same, namely "0001, 0011,0100." To differentiate the devices from each other, a device field may be added with a unique value for each device. For example, Device 8 may be assigned an LMA=0001,0011, 0100,00, and Device 9 may be assigned an LMA=0001,0011, 0100,01. In this manner different devices connected to a shared communication link may differentiate frames intended for other devices and discard frames that are not addressed to their uniquely assigned LMA.

In FIG. 4 several devices, such as Device 3, Device 5, Device 6, and Device 7, are connected to switches above the lowest tier level. In this case, the bits that would ordinarily be used by the lower tier level are irrelevant and may be set to any arbitrary value. In the illustrated example, this has been shown with xxxx. Where there is more than one device connected to a port of an upper tier switch, the unused switching field or a portion of the unused switching field may be used as a device field.

An example may help explain the use of these local MAC addresses in the example network. Assume that device 1, having an LMA=0001,0001,0010, would like to send a frame to device 5, having an LMA=0010,0100,xxxx. Device 1 will first obtain Device 5's LMA. Assigning LMAs and exchanging LMAs between devices will be described in greater detail below. Device 1 then composes a frame containing the Source LMA (SA) of the sending device and the Destination LMA (DA) of the destination device. In this instance, the frame would contain Device 1's LMA as the Source LMA and Device 5's LMA as the destination LMA. A simplified view of the frame would be: [DA=0010,0100,xxxx; SA=0001, 0001,0010; payload]. After constructing the frame, the device sends the frame over the link connecting it to switch 4.

Switch 4, upon receiving the frame, looks at the first two fields of the DA in the frame and compares that to its prefix to see if the frame is addressed to a device that is reachable through it. Thus, for example, if device 1 was sending a frame to device 2, Switch 4 would look at the first two fields 30, 32, and notice that the DA of the frame contained its prefix. This would indicate to the switch that the DA was associated with a device that is reachable through it. However, in this case, the first two fields are 0010,0100, which is not the prefix associated with Switch 4. Accordingly, Switch 4 knows that it can not reach the destination device and forwards the frame up toward the root of the tree over port 0000. It should be understood that the choice of port numbers here is illustrative and the invention is not limited in the manner of how ports are numbered or in the manner a switch determines which of its ports are connected towards the root of the tree, connected towards the bottom of the tree, or connected to devices or routers.

Switch 2, upon receiving the frame, will also inspect the destination MAC address to determine if it matches its prefix. Specifically, Switch 2 will inspect the first field to see if the DA is 0001. Since, in this case, the DA is 0010,0100,xxxx, Switch 2 is able to quickly determine that the device with the DA is not reachable through it, i.e., it is not attached to one of its downstream ports. Accordingly, Switch 2 will forward the frame toward the root of the tree.

Switch 1 is at the root of the tree. Upon receipt of a frame, Switch 1 will inspect the field assigned to it to determine which output port should be used to forward the frame. In this instance, field 1 of the DA is 0010, so switch 1 outputs the frame on the port associated with identifier 0010.

Switch 3 receives the frame and looks at the second field of the DA to determine the output port to be used to forward the frame on toward its destination. In this instance, the second field has value 0100, so Switch 3 will output the frame over the port associated with that value.

In this manner, LMAs having switching fields may be used to directly instruct switches how a frame should be handled without requiring the switches to perform a destination port lookup in a MAC address lookup table.

In this example, a switch at a lower tier that received a frame on a port connected to a switch at an upper tier assumed that the frame had been properly forwarded and used the LMA switching field assigned to the switch to make a forwarding decision. Alternatively, the switch at the lower tier may read the first several fields of the destination MAC address and compare that value with its prefix, as was done by the switches when the frame was received from a lower tier, and attempt to match those fields against its prefix. If the bit patterns do not match, the switch at the lower tier knows the frame is not intended for one if its destination ports and will forward it up the tree. In this manner, a switch can treat all frames alike without differentiating internally how frames from different ports are to be handled. Optionally, where the frame was received from a switch in an upper tier and the bit pattern does not match the lower tier switch's prefix, the lower switch may recognize this as a loop and discard the frame.

In this example, a switch at a first tier that receives a frame on a port not connected to a switch at a lower tier assumes that the frame has been properly forwarded to avoid loops and discards. Alternatively, the first tier switch may inspect the LMA field assigned to it to determine which output port should be used to forward the frame, and may discard the frame if the bit pattern matches the one of the port from where the frame was received or the bit pattern does not match any of the output ports of the first tier switch.

In this example, a switch at any tier that receives a frame with a global destination MAC address may discard the frame or it may redirect the frame to the control plane for processing or it may handle it in a conventional manner such as by using a MAC address table lookup procedure.

In FIG. 4, the LMA of the router is 0000,xxxx,xxxx. If another router (not shown in FIG. 4) is attached to port 0000, a router field may be added with a unique value for each router. For example, one router may be assigned an LMA=0000,xxxx,xxxx,00, and the other router may be assigned an LMA=0000,xxxx,xxxx,01. In this manner different routers connected to a same shared communication link can differentiate frames intended for other routers and discard frames that are not addressed to their uniquely assigned LMA. In this same manner, devices other than routers can also be attached to the same link used by a router.

In this example, switches in the various tiers were assumed to have similar field lengths. The invention is not limited to this example, however, as different switches may have different field lengths depending on their needs. For example, Switch 2 may have a 4 value switching field and Switch 3 may have a six value switching field. The LMA of a device connected through switch 2 would have an LMA=0001,xxxx, xxxx whereas the LMA of a device connected through Switch 3 would have an LMA=0100,xxxxxx,xxxx assuming switches in the third tier utilize 4 value switching fields. This should not cause a problem as long as two switches with different size switching fields are not connected to the same port of a switch in an upper tier.

Multicasting and unicast LMAs are differentiated by the group/individual bit of the IEEE 802 specified MAC address. Multicast LMAs are used for transmitting multicasting frames having a multicast group field instead of a switching field. A multicast lookup table is used to translate the multicast group field into a list of destination ports. The multicast group field in this case is used to directly access the entry in the multicast lookup table that contains the list of output ports. Higher layer protocols are used to maintain the multicast lookup tables and multicast LMAs.

LMAs thus may be used in a multi layer network built as a tree of switches where each switch in the tree uses a dedicated LMA switching field to make local forwarding decisions. The switching fields may be of different sizes between tiers and within tiers, as discussed in greater detail herein. Devices, such as personal computers and servers, may be connected to the bottom of the tree or anywhere along the branch of the tree up to the root of the tree. Devices connected to the root of the tree can easily multicast frames to all the other devices at the bottom of the tree. This feature can be exploited to broadcast video and audio in the multi layer network for residential addresses. Video and audio servers would then be connected to the root of the tree, while residential customers would be connected to the bottom of the tree.

Because the Local MAC addresses are used by the switches to directly forward frames in the local domain, assignment of LMAs is important to proper operation of the network. Also, as discussed above, the LMA of a device's interface has a switching field whose value depends on where on the switch the device's interface is connected, i.e., the switching field directly identifies the port number on the switch where the device is connected. Therefore, moving the device to another port on the switch, or to a port on another switch, will require a new LMA assignment. LMA assignment is therefore required every time an Ethernet link or other layer 2 link becomes active.

Figure 5:
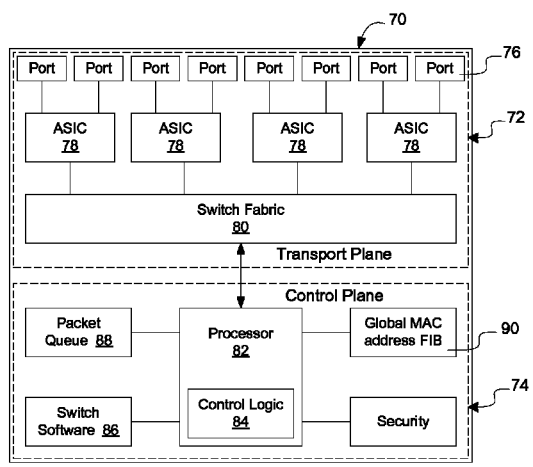
FIG. 5 is a functional block diagram of a simplified layer 2 switch configured to implement an embodiment of the invention.
Figure 6:
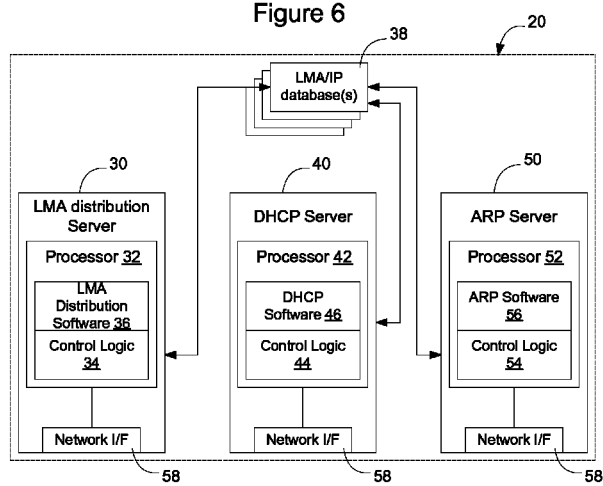
FIG. 6 is a functional block diagram of a location resolution server according to an embodiment of the invention.

Local MAC addresses may be assigned manually, for example as was done in connection with FIG. 4 and as described above. However, with a large network with hundreds of switches and tens or hundreds of thousands of end devices, this may not be practical. FIGS. 5 and 6 collectively illustrate and describe a manner in which local MAC addresses may be assigned on a local domain, for example by a Location Resolution Server (LRS) 18 (see FIGS. 4 and 6.). While the functions of the LRS 18 will be described in connection with assigning LMAs on the network, the functionality of the LRS is not limited to this aspect of interaction on the network, as the LRS may also be used to perform other services, such as resolving addresses on the network.

Assignment of an LMA may be performed automatically by a switch whenever a new device is connected to one of its interfaces. Specifically, the switch knows its prefix, which is the portion of all LMAs that are reachable through it. The switch also knows how it identifies ports, since it is already using this information to switch frames. Accordingly, when a switch senses that a new device has been connected at one of its ports, it may automatically or in response to a request assign the device connected to that port an LMA using its prefix and connected port information.

There are other ways that an LMA may be assigned as well. For example, assignment of an LMA for a new device may be done centrally, such as by the Location Resolution Server 18 illustrated in FIG. 4. For example, when a device is connected to a switch, the device or the switch may generate a request for an LMA assignment. The request may be passed to the LRS over the data plane or over a control plane (a separate network linking the network elements and configured to handle control traffic and, optionally, some data traffic). Optionally, the request may include the switch's prefix and/or port identification information. Using information contained in the request and optionally other information known by the LRS about the topology of the network, the LRS may generate an LMA for the device. The invention is not limited to these several described ways of assigning LMAs on the network.

In addition to obtaining an LMA, the device may also send a request to a Dynamic Host Control Protocol (DHCP) server to obtain an Internet Protocol (IP) address in a standard manner. The IP address and Local MAC Address (LMA) for the new device will then be stored in an LMA/IP database (see FIG. 6) to enable IP and MAC addresses to be resolved on the network, as discussed in greater detail below.

The LMA is communicated to the switch in a standard fashion. Optionally, until the new LMA is assigned and accepted by the device, the device's global MAC address may be used to identify communications to be sent to it. Where a frame using the device's new LMA as the DA is to be used to communicate with the device, to prevent the device from rejecting the response from the LMA distribution server, the device should be set to promiscuous mode in which it is configured to receive all frames. At this point, the device is configured with a local MAC address and optionally an IP address and is ready to begin participating in communications on the network.

When a switch joins the network, it generally will not be assigned a local MAC address on the data plane since communications will not generally be sent directly to it over the data plane. One possible exception is in connection with control traffic. Generally, where there is a control plane, the control traffic, e.g. Simple Network Management Protocol (SNMP), traffic will be addressed to the switch over the control plane using the switch's global MAC address or a local MAC address assigned to the switch on the control plane. Where control traffic is to be sent over the data plane, a local MAC address may be used to address traffic to the switch. This local MAC address may be assigned in a manner similar to how device LMAs are assigned, for example by a switch in an upper tier or by the Location Resolution Server.

When a first device wants to communicate with a second device on the network, it will need to obtain the second device's MAC address. FIG. 6 illustrates a location resolution server that has three independent servers configured to perform services on the network. In FIG. 6, an LMA distribution server is tasked with collecting and optionally assigning local MAC addresses and storing those LMAs in an LMA/IP database. A DHCP server is tasked with assigning IP addresses on the network. According to an embodiment of the invention, the IP addresses are also included in the LMA/IP database so that it is possible to associate an LMA with an IP address. An Address Resolution Protocol (ARP) server is also configured, according to an embodiment of the invention, to process ARP requests on the network by interfacing with the LMA/IP database.

In a known manner, if the first device knows the LMA of the second device it can send frames directly to the second device using its known LMA. If the first device does not know the LMA of the second device but knows its IP address, it may generate an Address Resolution Protocol request to obtain the LMA of the second device. If it doesn't know its IP address it may first obtain the device's IP address e.g. from a Domain Name Server request.

According to an embodiment of the invention, a switch, upon receipt of an ARP request (which is usually a broadcast frame), may change the ARP request frame into a unicast frame addressed to the ARP server or may encapsulate the original frame into a unicast frame addressed to the ARP server. The resulting frame is then sent over the data plane or the control plane to the ARP server, such as the ARP server illustrated in FIG. 6. Alternatively, the original ARP request may be allowed to be broadcast in a standard fashion to reach the ARP server. Upon receiving an ARP request (in any of the forms as described above), the ARP server will interface with the LMA/IP database to obtain the LMA for the second device. The ARP server then communicates to the requesting device, in a known manner, the LMA of the second device However, changing a broadcast ARP request frame into a unicast frame addressed to the ARP server or encapsulating a broadcast ARP request frame into a unicast frame addressed to the ARP server, according to an embodiment of the invention, enables ARP request traffic to be reduced Depending on the topology of the network, it may be possible to assign more than one LMA to a device, depending on the path the frame is to take reach the end device. For example, if both switch 2 and switch 3 were connected to switch 4, it may be possible to reach device 1 and device 2 using two different paths through the network (one path via switch 2 and one path via switch 3). According to one embodiment, the location resolution server may store alternate LMAs in its database. If network congestion or outage information is communicated to the location resolution server, the location resolution server may respond to ARP requests by providing the LMA that directs traffic around the network problem. In this manner, LMA routing and/or load balancing may be performed to improve transmission characteristics of the network.

Where Internet Protocol addressing is not used by a device, LMAs may be discovered using other commonly available protocols and the invention is not limited to a network in which IP is being used as an addressing protocol.

FIG. 5 illustrates one embodiment of a network element 70 configured to implement a layer 2 switch utilizing direct LMA switching. As shown in FIG. 5, the layer 2 switch 70 is divided into two logical sub-sections—a transport plane 72 and a control plane 74. The transport plane contains network ports 76, ASICs 78, and a switch fabric 80. The transport plane is configured to handle frames on behalf of the network element using frame contained destination information to make output port decisions. The ASICs and the switch fabric may be configured to read the destination MAC address field assigned to the switch and directly switch the frame to the destination port based on the destination MAC address. Similarly, as discussed above, the ASICs and the switch fabric may be configured to read other fields of the destination MAC address to ascertain whether the frame is intended for the switch and, if not, forward the frame up the tree toward the root. Where information in the frame other than the destination MAC address is used to forward the frame, the ASICs may use that information instead.

The ASICs and switch fabric may also be configured to inspect the global/local bit to ascertain whether the MAC address is a local MAC address or a global MAC address. As discussed above, frames with global MAC addresses may be discarded or redirected to the control plane 74 for processing or handled in a conventional manner such as by using a MAC address table lookup procedure. Similarly, the ASICS and switch fabric may be configured to inspect the multicast bit to ascertain if the information contained in the destination MAC address is related to multicast fields. Multicast frames, according to one embodiment, are handled by the control plane, although they may also be handled by the transport plane if the transport plane is so configured.

The control plane of the network element includes a processor 82 containing control logic 84 configured to implement the functions ascribed to the switch 70 discussed herein in connection with FIGS. 1-4. The switch's control plane has a native or interfaced memory containing data and instructions to enable the processor to implement the functions ascribed to it herein, and contained in the switch software 86. For example, the switch software may enable the switch to process LMA requests, ARP requests, and engage in other protocol exchanges on the network. The switch software may also enable the switch to set certain values and bit patterns on the transport plane of the switch, such as the LMA of the switch ports, the field allocation so that the transport plane knows what portion of LMAs it should be reading, and other values that will enable the switch to perform the functions described above.

The control plane of the network element may also include one or more functional modules such as a queue 88 to enable the network element to store frames while being processed by the network element, and a global MAC address Forwarding Information Base (FIB) 90 to enable the network element to handle frames that are not designated as having a local MAC address. Other modules may be included as well, such as a security module, and the invention is not limited to an implementation having only these several described components or this particular configuration.

The control logic 84 may be implemented as a set of program instructions that are stored in a computer readable memory within the network element and executed on a microprocessor, such as processor 82. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

FIG. 6 illustrates a location resolution server 20 according to an embodiment of the invention in which the location resolution server has been implemented as a family of servers interfacing an LMA/IP database. The location resolution server family may be configured as a family of servers as illustrated or several or all of the servers may be instantiated on a common computing platform. The invention is not limited to the manner in which the various servers are implemented. Additionally, the several servers and database may be placed in close physical proximity or distributed geographically. The invention is not limited to the particular geographic implementation of the location resolution server.

As shown in FIG. 6, the location resolution server according to this embodiment of the invention includes an LMA distribution server 30 containing a processor 32 having control logic 34 and running LMA distribution software 36. The LMA distribution server is interfaced with the LMA/IP database to enable it to store LMAs in the LMA/IP database 38 and otherwise affect transactions on the database.

The location resolution server also includes a DHCP server 40 containing a processor 42 having control logic 44 and running DHCP software 46. The DHCP server functions in a standard manner to assign IP addresses to devices on the network. The DHCP server according to an embodiment of the invention is also configured to store the IP addresses in the LMA/IP database 38.

The location resolution server also includes an ARP server 50 configured to provide LMAs in response to local ARP requests generated by devices connected to the network. The ARP server 50 contains a processor 52 having control logic 54 and running ARP software 56. The LMA distribution server 30, the DHCP server 40, and the ARP server 50 all include network interfaces 58 to enable them to communicate on the network.

The control logic 34, 44, 54 may be implemented as a set of program instructions that are stored in a computer readable memory within the network element and executed on a microprocessor, such as respective processor 32, 42, 52. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A communication network, comprising:
a first switch configured to:
receive a frame, the frame having a media access control (MAC) header including at least one MAC address, the MAC address having an address portion;
extract switching information from a sub-field of the address portion;
make a switching decision based on the switching information extracted from the sub-field to determine an output port of the first switch through which the frame should be forwarded onto the communication network without performing a lookup operation in a forwarding table based on the entire address portion of the MAC address; and
transmit the frame as a forwarded frame from the determined output port onto the communication network; and
a second switch configured to:
receive the forwarded frame;
extract additional switching information from another sub-field of the address portion; and
make another switching decision based on the extracted additional switching information to determine an output port of the second switch over which the forwarded frame should be forwarded onto the communication network without performing a lookup operation in the forwarding table based on the entire address portion of the MAC address.

2. The network of claim 1, comprising further switches, each configured to:
receive a respective frame, the respective frame having a respective MAC header including at least one respective MAC address, the respective MAC address having an address portion;
extract respective switching information from a respective sub-field of the address portion;
make a respective switching decision based on the respective switching information extracted from the respective sub-field to determine a respective output port through which the respective frame should be forwarded onto the communication network without performing a respective lookup operation in the forwarding table based on the entire address portion of the respective MAC address; and
transmit the respective frame from the determined respective output port onto the communication network.

3. The network of claim 1, wherein the address portion of the frame comprises a plurality of sub-fields.

4. The network of claim 3, wherein:
each sub-field of the plurality of sub-fields is associated with a respective switch of the communication network; and
switching decisions based on a particular sub-field of the plurality of sub-fields are only made at a respective switch associated with the particular sub-field.

5. The network of claim 1, wherein at least one of the first switch and the second switch is configured to assign a local MAC address to another switch to which the at least one switch is communicatively connected.

6. The network of claim 1, further comprising a local MAC address distribution server, the local MAC address distribution server being configured to assign local MAC addresses to switches of the communication network.

7. A switch for a communication network, the switch comprising:
- at least one port coupled to the communication network, the at least one port being configured to receive a frame having a media access control (MAC) header comprising at least one MAC address, the MAC address having an address portion; and
- at least one frame processing element coupled to the at least one port, the frame processing element being configured to:
  - extract switching information from a sub-field of the address portion;
  - make a switching decision based at least in part on the switching information extracted from the sub-field to determine an output port through which the received frame should be forwarded onto the communication network without performing a lookup operation in a forwarding table based on the entire address portion of the MAC address; and
  - forward the received frame through the determined output port onto the communication network.

8. The switch of claim 7, wherein the at least one frame processing element is an application specific integrated circuit.

9. The switch of claim 7, further comprising;
- at least one switching fabric communicatively connected to the at least one frame processing element, the switching fabric being configured to operate under control of the at least one frame processing element to route the frame to the determined output port.

10. The switch of claim 9, further comprising:
- at least one processor; and
- at least one address forwarding information base coupled to the processor, the at least one frame processing element being configured to:
  - determine whether a MAC address in the received frame is one of a local MAC address and a global MAC address;
  - when the MAC address is a local MAC address, to determine an output port based at least in part on the local MAC address without performing a lookup operation in a forwarding table based on the entire address portion of the MAC address; and
  - when the MAC address is a global MAC address, to forward the received frame to the at least one processor, the at least one processor being configured to determine an output port using the Global MAC address and the at least one forwarding information base.

11. The switch of claim 10, wherein the at least one processor is communicatively coupled to the at least one frame processing element via the at least one switching fabric.

12. The switch of claim 7, wherein the address portion of the received frame is divided into a plurality of sub-fields, one sub-field of the address portion being associated with the switch and all other sub-fields of the address portion not being associated with the switch.

* * * * *